J. W. CAMPBELL.
Ellipsograph.
No. 16,175.
Patented Dec. 9, 1856.
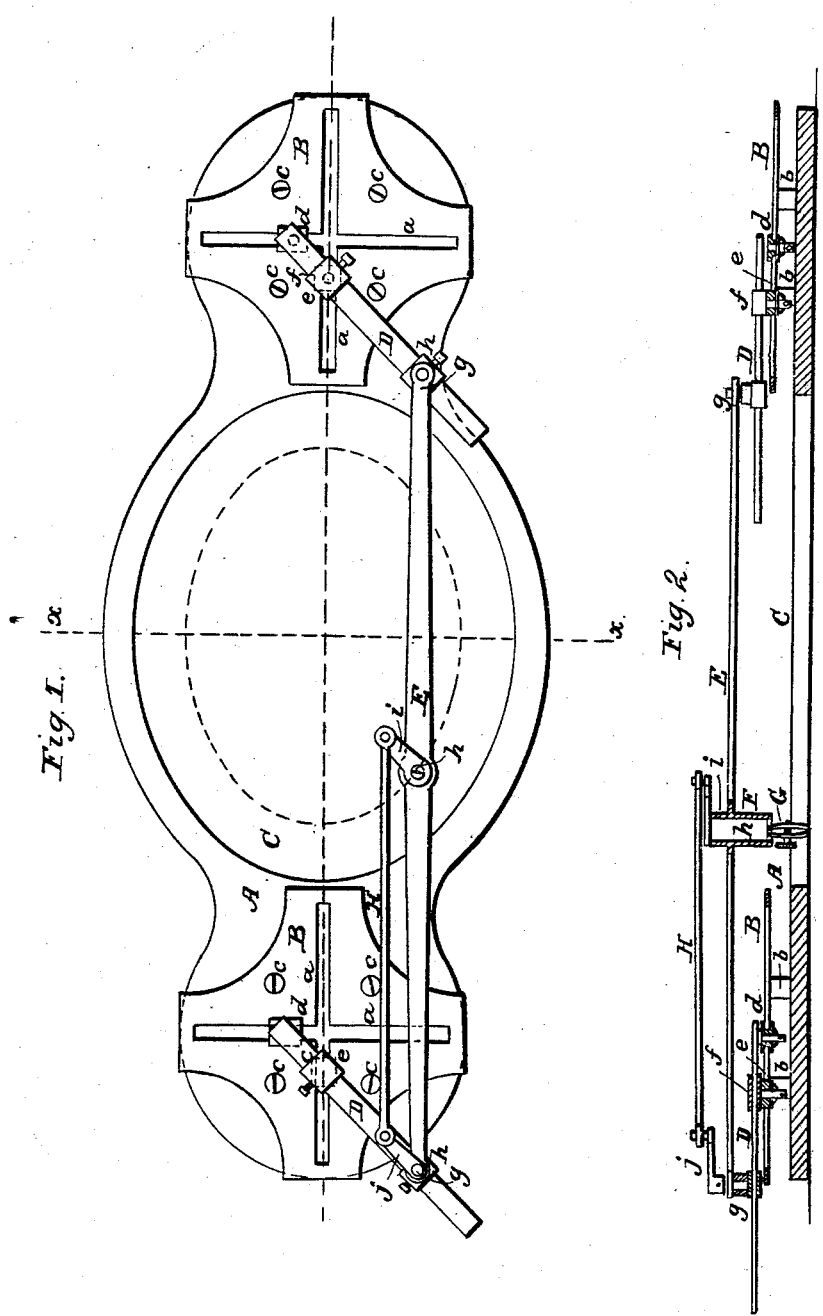

UNITED STATES PATENT OFFICE.

JAMES W. CAMPBELL, OF BROOKLYN, NEW YORK.

ELLIPTOGRAPH.

Specification of Letters Patent No. 16,175, dated December 9, 1856.

*To all whom it may concern:*

Be it known that I, J. W. CAMPBELL, of Brooklyn, eastern district, in the county of Kings and State of New York, have invented a new and Improved Implement for Describing Ovals or Ellipses; and I do hereby declare that the following is a full, clear, and exact description of the same, reference being had to the annexed drawings, making a part of this specification, in which—

Figure 1, is a plan or top view of my improvement. Fig. 2, is a transverse vertical section of ditto, $x$, $x$, Fig. 1, showing the plane of section.

Similar letters of reference indicate corresponding parts in the two figures.

My invention consists in connecting the beams of two trammels by a rod or bar which has the pen secured at the center.

To enable those skilled in the art to make and use my invention, I will proceed to describe it.

A, represents what may be termed a bed plate, having a plate B, attached to each end of it and an elliptical opening C, made through its center, said opening extending from one plate B, to the other.

Each plate B, has two slots $a$, $a$, made through it, the slots in each plate crossing each other at right angles, as shown clearly in Fig. 1. The plates B, rest upon short supports $b$, through which screws $c$, pass into the bed-plate, said screws also passing through the plates B, B.

D, D, represent two beams one placed on each plate B. Each beam has two guides $d$, $e$, attached to it. These guides are fitted and work in the slots $a$. The guides $d$, at the extremity of the beams D, are permanently attached to it, but the other guides $e$, are attached to sockets or slides $f$, on the beam and are consequently adjustable.

The plates B, B, and beams D, D, form what are termed trammels and they have long been known and used simply for describing ovals, a pencil being attached to the outer end of the beam.

E, represents a bar, the ends of which are fitted on pins $g'$ attached to slides $h$, on the beams D, D. At the center of the bar E, a vertical pendent tube F, is attached and within this tube the pen G, is placed, the pen being attached to a cylinder $h^1$, which fits the bore of the tube. The upper end of the cylinder $h^1$, has a crank or arm $i$, attached to it, and a similar crank or arm $j$, is attached to the pin $g$, on the slide of one of the beams D. A connecting rod H, is attached to the ends of these cranks or arms.

From the above description of parts it will be seen that by moving the bar E, so that the two beams D, D, will rotate on the plates B, the pen G, will describe an oval, the pen G, describing the same ellipse or oval as the pins $g$, on the beams D, D, and it will also be seen that the implement may be readily adjusted so that the ellipse or oval may be drawn at the desired spot, because the opening C, is unobstructed by any of the parts and the work is in plain sight.

As the oval is being described, the pen G, is gradually turned by the cranks or arms $i$, $j$ and the rod H, so that its slit will always be in line with the direction of its path. This is an important feature, because a clear line cannot be drawn by the pen unless it is turned, and consequently the trammel, as formerly used, was worthless for drawing in ink; a pencil could be employed, but not open.

A single trammel, as previously stated has been used for drawing ovals, the pencil being attached to the end of the beam, but the great objection to their use is that in applying the trammel to the drawing it covers the center of the ellipse to be drawn, and consequently great uncertainty attended its use. The draftsman was compelled to find the boundaries of the ellipse or oval in order to enable him to place the trammel at the proper spot upon the drawing. By my improvement, this difficulty is avoided.

Although the pen is described as being turned by cranks and a connecting rod, still gearing would answer and also pulleys and a band, but they are both equivalent to the cranks and rod.

Having thus described my invention, what I claim as new and desire to secure by Letters Patent, is,

Attaching the bar E, to the two beams D, D, of the plates B, B, the pen G, being secured at the center of said bar, substantially as described, for the purpose set forth.

JAMES W. CAMPBELL.

Witnesses:
C. R. PECK,
JAMES F. BUCKLEY.